(12) United States Patent
Yoon et al.

(10) Patent No.: US 6,717,637 B1
(45) Date of Patent: Apr. 6, 2004

(54) LIQUID CRYSTAL DISPLAY HAVING WIDE VIEWING ANGLE

(75) Inventors: Yea-Sun Yoon, Seoul (KR); Seung-Beom Park, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/431,157

(22) Filed: Nov. 1, 1999

(30) Foreign Application Priority Data

Oct. 30, 1998 (KR) .............................. 98-46153

(51) Int. Cl.[7] .............................. G02F 1/1335
(52) U.S. Cl. ...................... 349/106; 349/130
(58) Field of Search .................. 349/106, 129, 349/143, 110, 130

(56) References Cited

U.S. PATENT DOCUMENTS

| | | | | |
|---|---|---|---|---|
| 5,309,264 A | * | 5/1994 | Lien et al. ............ | 359/87 |
| 5,434,690 A | | 7/1995 | Hisatake et al. | |
| 5,608,556 A | * | 3/1997 | Koma ................... | 349/143 |
| 5,790,219 A | * | 8/1998 | Yamagishi et al. .... | 349/106 |
| 6,100,953 A | * | 8/2000 | Kim et al. ............. | 349/129 |
| 6,285,431 B2 | * | 9/2001 | Lyu et al. ............. | 349/143 |

FOREIGN PATENT DOCUMENTS

| | | |
|---|---|---|
| JP | 2000-047217 | 2/2000 |
| JP | 2000-162599 | 6/2000 |

* cited by examiner

*Primary Examiner*—Kenneth Parker
*Assistant Examiner*—David Chung
(74) *Attorney, Agent, or Firm*—McGuireWoods LLP

(57) ABSTRACT

Color filters of an LCD are formed so as to have grooves. A common electrode is formed thereon to have a rugged non-smooth profile due to the grooves. A skewed electric field is formed due to the rugged non-smooth profiled common electrodes. Two domains in which alignment directions of liquid crystal molecules are opposite to each other are separated by the grooves as a boundary, and hence, the viewing angle of the LCD is broadened. A black matrix may be formed to overlap the grooves to reduce light leakage induced due to the groove. To prevent common electrodes from disconnecting around the groove, the common electrode layer is preferably thinly deposited two times.

30 Claims, 7 Drawing Sheets

LIQUID CRYSTAL DISPLAY HAVING WIDE VIEWING ANGLE

BACKGROUND OF THE INVENTION (a) Field of the Invention

The present invention relates to a liquid crystal display having a wide viewing angle, and more particularly, to a liquid crystal display in which a viewing angle of the same is made wide by patterning apertures in electrodes.

(b) Description of the Related Art

Liquid crystal displays (LCDs) typically include two substrates and a liquid crystal layer interposed between the substrates. The transmittance of light is controlled by the intensity of an electric field applied to the liquid crystal layer.

A vertically aligned twisted nematic (VATN) mode LCD has two transparent substrates each having transparent electrodes, a liquid crystal material interposed between the two substrates, and two polarizing films attached to the outside surfaces of the two substrates. In the absence of an electric field, liquid crystal molecules take on a homeotropic orientation in which the long axes of the molecules are perpendicular to the substrates. If an electric field is applied between the substrates, the liquid crystal molecules are aligned parallel to the substrates and are twisted helically to take on a pitch.

In a VATN mode LCD, liquid crystal molecules take on a homeotropic orientation in which the long axes of the molecules are perpendicular to the substrates. With this configuration, light is cut off almost completely in an "off" state when an electric field above a certain value is not applied to a liquid crystal layer that is sandwiched between two polarizing films whose polarizing axes are perpendicularly oriented. In the normally black mode, since brightness in the off state is extremely low, a significantly higher contrast ratio can be obtained when compared to the contrast ratio of conventional twisted nematic LCDs. However, light retardation is greatly changed according to a viewing direction. Therefore, VATN mode LCDs also have the same problem of narrow viewing angles as does the conventional twisted nematic LCDs.

To solve this problem, many methods of patterning electrodes and the use of a skewed field to form multi-domain regions have been proposed. In U.S. Pat. No. 5,309,264, Lien disclosed a method of forming "X"-shaped apertures on the transparent electrodes of one of the two substrates. In U.S. Pat. No. 5,434,690, there is also disclosed a method of forming apertures on transparent electrodes of both of the two substrates by turns.

However, to apply above described methods, another photolithography step is needed to pattern a common electrode. If color filters are exposed to liquid crystal material, pigments of the color filters may affect to the liquid crystal material. To prevent this problem from occurring, an overcoating layer should be formed on the color filters. Furthermore, serious light leaks from around the boundaries of the apertures can occur.

SUMMARY OF THE INVENTION

The present invention has been made in an effort to solve the above problems.

It is an object of the present invention to provide a liquid crystal display having a wide viewing angle.

To solve the above problems, the present invention provides a multi-domain LCD of which color filters have grooves and common electrodes are formed on the color filters.

A black matrix may also be formed to overlap the grooves to prevent light leakage.

Pixel electrodes formed on a thin film transistor array panel may have an aperture. In this case, if the aperture and the color filter grooves are alternately arranged in a parallel manner, a wide viewing angle and a stable alignment of liquid crystal molecules are achieved.

Additionally, if the indium-tin-oxide (ITO) is thinly deposited twice to form the common electrode, a disconnection of the common electrode around the groove is prevented.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1A:
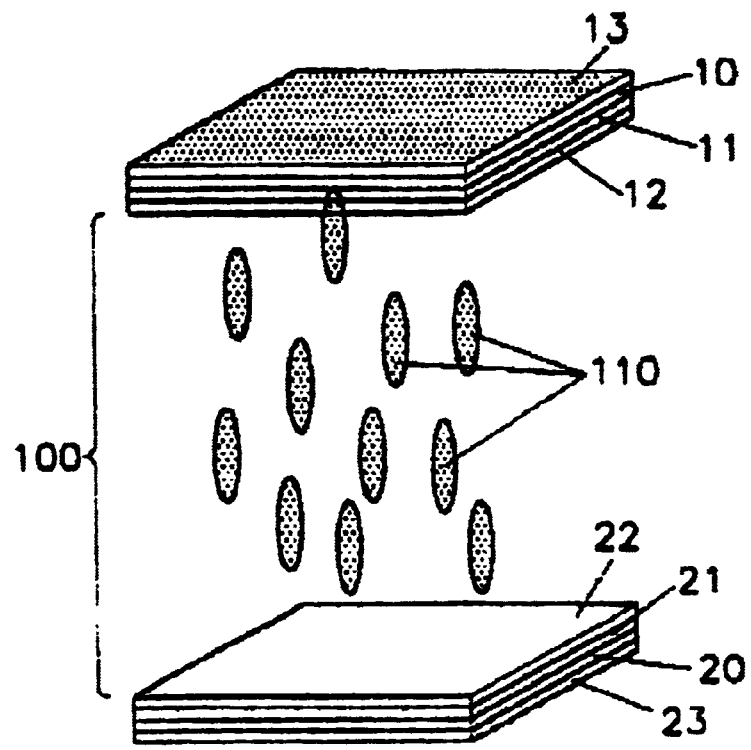
FIGS. 1A and 1B are schematic views respectively showing alignment of liquid crystal molecules in a black mode and in a white mode of a vertically aligned mode LCD.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art In the drawings, the thickness of layers and regions are exaggerated for clarity. Like numbers refer to like elements throughout. It will be understood that when an element such as a layer, region, or substrate is referred to as being "on" another element, it can be directly on the other element or intervening elements may also be present. In contrast, when an element is referred to as being "directly on" another element, there are no intervening elements present.

Figure 1B:
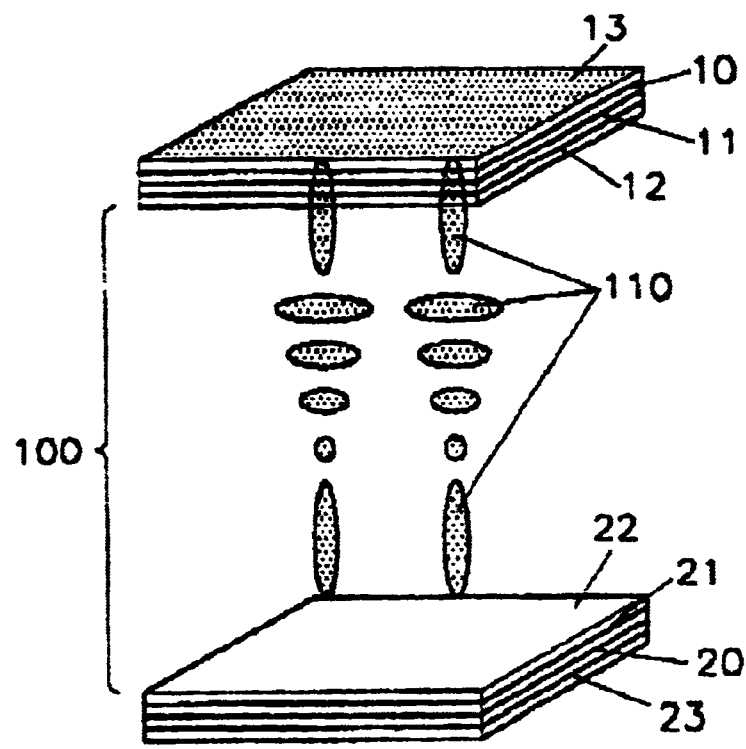

FIGS. 1A and 1B are schematic views respectively showing alignment of liquid crystal molecules in a black mode and in a white mode of a vertically aligned mode LCD.

As shown in FIGS. 1A and 1B, two insulating substrate 10 and 20 of transparent material such as glass or quartz are facing each other. Electrodes 11 and 21 composed of conducting materials, particularly transparent conducting materials such as ITO, and vertical alignment layer 12 and 22 are sequentially formed on the inner sides of the substrates 10 and 20. A liquid crystal layer 100 of liquid crystal material having negative dielectric anisotropy is interposed between the two alignment layers 12 and 22. At this time, the liquid crystal layer 100 may have chirality. The liquid crystal molecules of the liquid crystal layer 100 may be twisted when an electric field is applied by treating the alignment layers 12 and 22. Polarizing films 13 and 23, polarizing light respectively coming out from the liquid crystal layer 100 and light entering into the liquid crystal layer 100, are respectively attached to the outer sides of the substrates 10 and 20. The polarizing axes of the two polarizing films 13 and 23 are perpendicular to each other. The alignment layers 12 and 22 may or may not be rubbed.

As shown in FIG 1A, when there is no electric potential difference between the two electrodes 11 and 22, or in other words, no electric field is applied to the liquid crystal layer 100, the long axes of liquid crystal molecules 110 are aligned to be perpendicular to the substrates 10 and 20 by the aligning influence of the alignment layer 12 and 22.

In this condition, a linearly polarized light passing the polarizing film 23 goes through the liquid crystal layer 100 without change of polarizing direction. Therefore, the polarizing film 13 attached to the upper substrate 10 does not allow the passage of this linearly polarized light. As a result, the LCD shows a black state.

When a difference of electric potential is applied between the two electrodes 11 and 21, an electric field with field lines perpendicular to the surfaces of the substrates 10 and 20 is formed. This electric field rearranges the liquid crystal molecules 110.

As shown in FIG. 1B, if the electric field applied to the liquid crystal layer 100 is strong enough, the long axes of the liquid crystal molecules 110 are rearranged to be perpendicular to the electric field lines, or in other words, parallel to the substrates 10 and 20, because of their negative dielectric anisotropy. However, the liquid crystal molecules 110 near the alignment layers 12 and 22 maintain their initial state because they are more affected by the aligning Influence of the alignment layer 12 and 22 than the electric field force. At the same time, the liquid crystal molecules 110 are helically twisted because of their characteristic chirality., The chirality of liquid crystal layer 100 can be controlled so that the directors of the liquid crystal molecules 110 rotate 90° from the lower alignment layer 22 to the upper alignment layer 12.

In this condition, a linearly polarized light passing the polarizing film 23 has its polarizing direction rotated along with the twist of the liquid crystal directors. Therefore, the polarizing direction rotates 90° until it passes through the liquid crystal layer 100. The light can therefore pass through the polarizing film 13 attached to the upper substrate 10. As a result, the LCD shows a white state.

Figure 2:
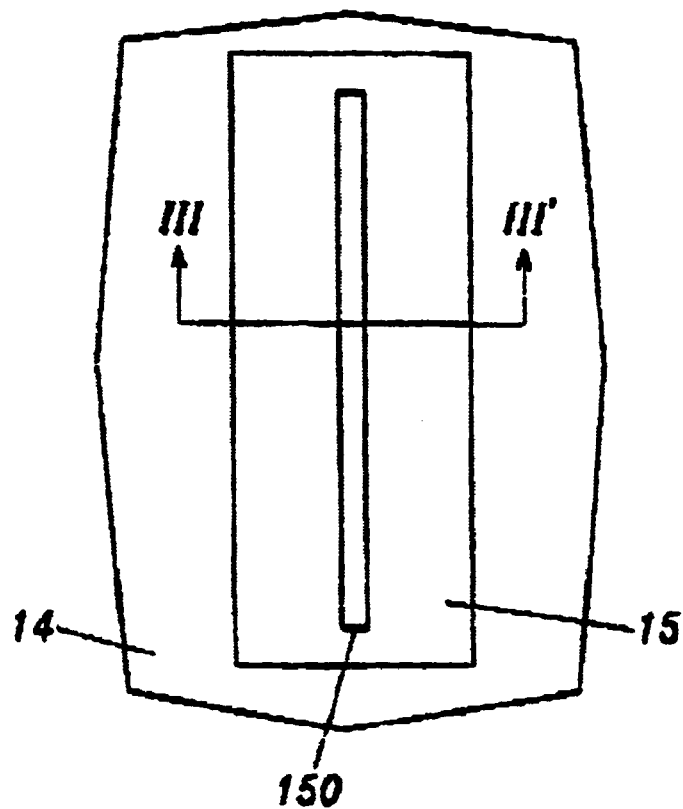
FIG. 2 is a partial plan view of a color filter array panel for an LCD according to a first embodiment of the present invention.
Figure 3:
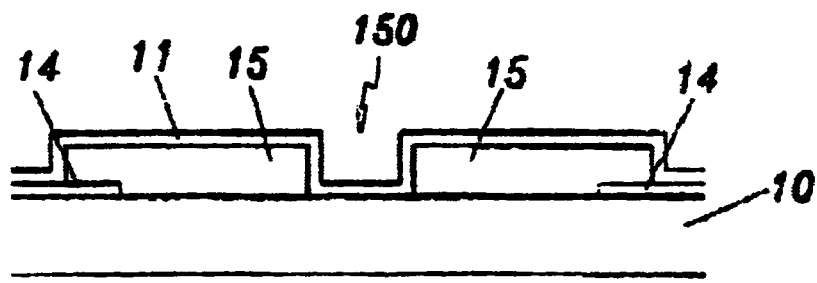
FIG. 3 is a cross-sectional view taken along section line III–III' of FIG. 2.

FIG. 2 is a partial plan view of a color filter array panel for an LCD according to a first embodiment of the present invention, and FIG. 3 is a cross-sectional view taken along section line III–III' of FIG. 2.

As shown in FIGS. 2 and 3, a black matrix 14, composed of materials such as chromium or organic black resist, is formed on a transparent insulating substrate 10 to define pixel areas. Red, green, and blue (R, G, and B) color filters 15 are formed in the pixel areas. The color filters 15 have a long central aperture 150 extending in a vertical direction in FIG. 2. A common electrode 11, composed of transparent conducting materials such as ITO, is formed over the whole substrate 10 on the color filters 15. The common electrode 11 hence forms a rugged non-smooth surface (or a surface with peaks over the color filters 15, and valleys over the aperture 150).

Figure 4:
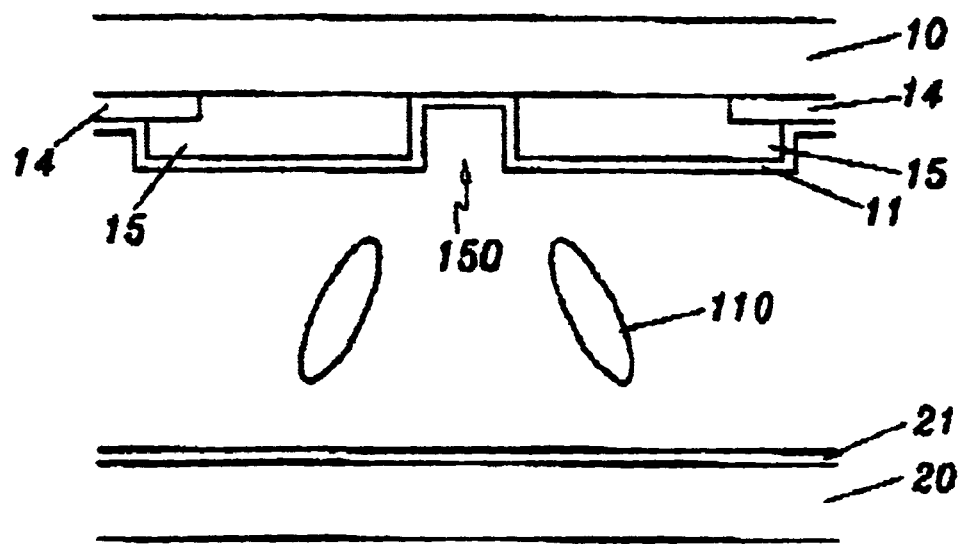
FIG. 4 is a cross-sectional view of an LCD according to the first embodiment of the present invention.

FIG. 4 is a cross-sectional view of an LCD made by assembling the color filter array panel of FIG. 3 with a thin film transistor array panel showing the motions of liquid crystal molecules.

As shown in FIG. 1A, when no electric field is applied to the liquid crystal molecules 110, the liquid crystal molecules 110 are perpendicularly aligned with the substrates 10 and 20. The LCD displays black in the same manner as does an LCD having an unpatterned color filter.

As shown in FIG. 4, when an electric potential difference is applied between the electrodes 11 and 21, an electric field, with field lines that are not perpendicular to the substrates 10 and 20 but which instead are slanted at some angle, is formed. This slant is due to the fact that electric equipotential field lines are contoured along with the rugged non-smooth surface formed by common electrode 11.

Since the liquid crystal molecules have negative dielectric anisotropy, they tend to align perpendicular to the electric field lines. Therefore, liquid crystal molecules 110 near the aperture 150 are twisted and slant with respect to the substrates 10 and 20. As a result, the aperture 50 divides the pixel area into two domains where the slanting direction of the liquid crystal molecules are opposite to each other. The two domains compensate for the optical properties of each other. Therefore, the LCD can achieve a wide viewing angle.

In the present invention, as shown in FIGS. 2 and 4, a multi-domain mode is achieved by forming apertures in the color filters. This method is much simpler than prior methods, such as rubbing. The present invention has advantages of forming minute domains and of forming domains in a variety of shapes.

Additionally, the color filters 15 may be etched to a depth less than that of the whole thickness of the color filter 15 to form the apertures 150.

Apertures may also be formed in the pixel electrodes as well as in the color filters.

Figure 5:
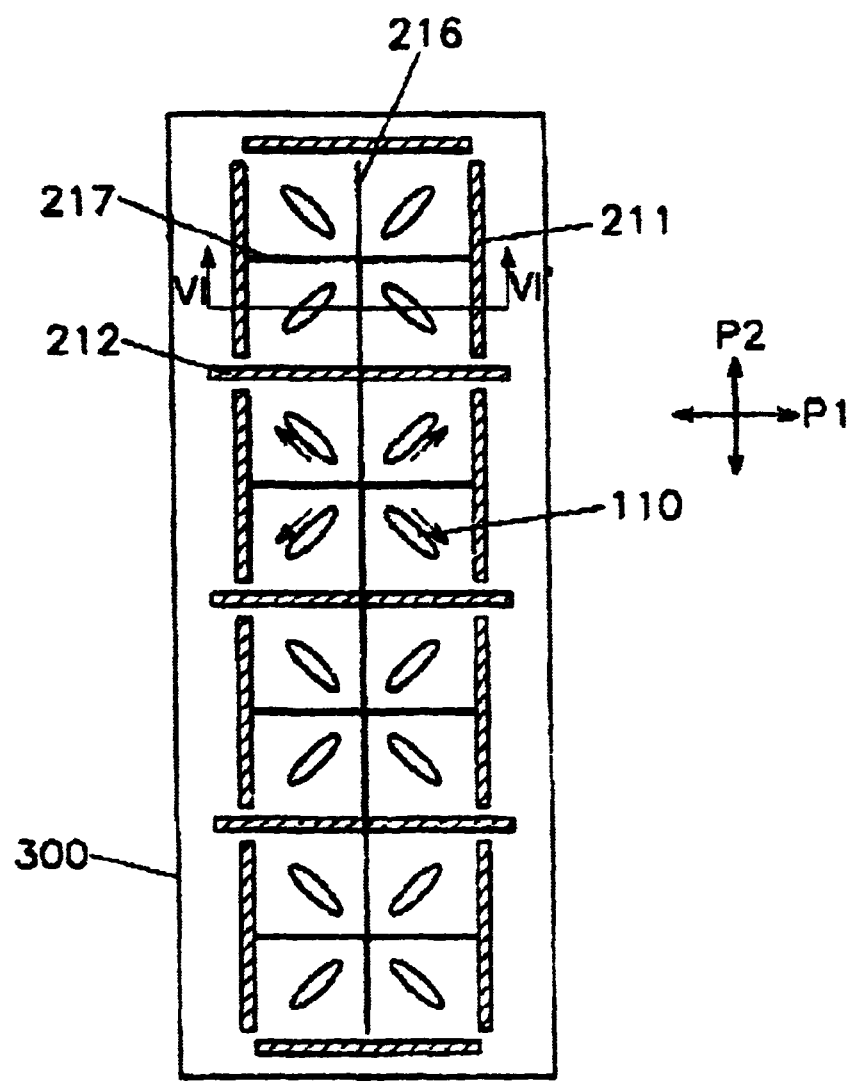
FIG. 5 is a partial plan view of an LCD according to a second embodiment of the present invention.
Figure 6:
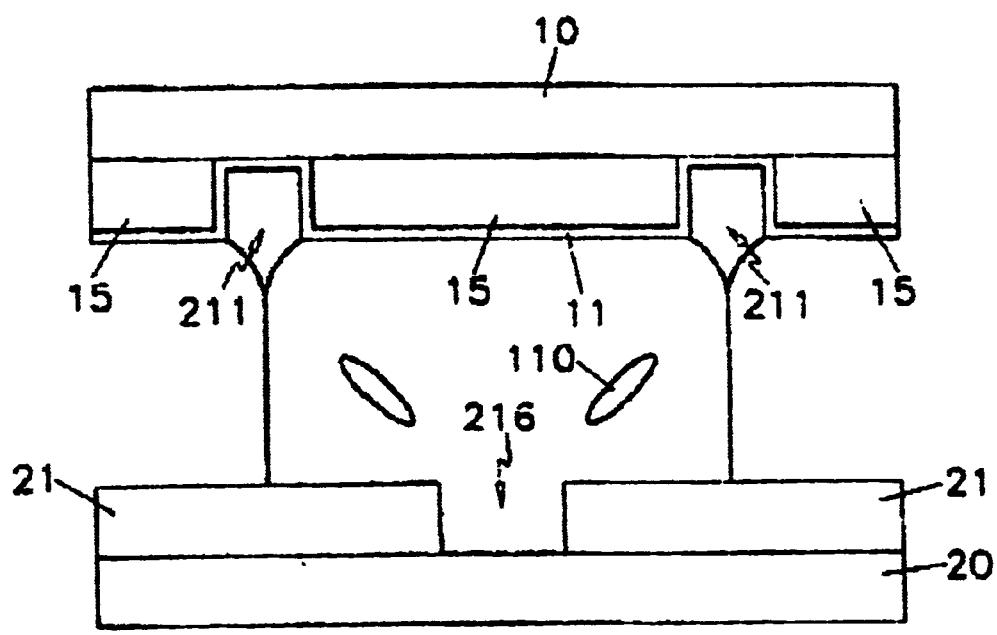
FIG. 6 Is a cross-sectional view taken along section line VI–VI' of FIG. 5.

FIG. 5 is a partial plan view of an LCD according to a second embodiment of the present invention, and FIG. 6 is a cross-sectional view taken along section line VI–VI' of FIG. 5.

An LCD generally has a plurality of pixel areas. However, in FIGS. 5 and 6, only one pixel area is illustrated. Furthermore, only the apertures formed in a color filter of an upper substrate and in an electrode of a lower substrate are illustrated. The other elements, such as a thin film transistor and wires, are not illustrated for simplification.

As shown in FIGS. 5 and 6, a plurality of linear apertures 211, 212, 216, and 217 are formed in a rectangular pixel area 300. First and second apertures 211 and 212 respectively extending In horizontal and vertical directions in FIG. 5 are formed in a color filter 15 of the upper substrate 10. A cross shape created by apertures 216 and 217 having a first part 216 and a second part 217 respectively extending in the vertical direction and to the horizontal direction in FIG. 5 is formed in an electrode of the lower substrate 20.

The first aperture 211 and the second aperture 212 do not touch each other, but are arranged to form four large squares.

The first part aperture 216 of the lower substrate 20 crosses a center of the pixel 300 in a vertical direction in FIG. 5. Therefore, the first part 216 divides the squares formed by the first and the second apertures 211 and 212 into two portions. According to the view provided in FIG. 5, both ends of the first part 216 are closely adjacent to second apertures 212. The second part apertures 217 respectively cross the centers of the squares formed by the first and the second apertures 211 and 212 in a horizontal direction in FIG. 5. Furthermore, both ends of the second part 217 are shown as being closely adjacent to the first aperture 211 in the perspective provided in FIG. 5.

The apertures 211, 212, 216, and 217 of both substrates 10 and 20 form a plurality of square shaped minute domains. Two adjacent sides of such square shaped minute domains are the apertures 211 and 212 of the upper substrate 10. The other two adjacent sides of these square shaped minute domains are the apertures 216 and 217 of the lower substrate 20.

The liquid crystal molecules' alignment of the above-described LCD will now be described with reference to FIG. 6.

As shown in FIG. 6, the skewed field formed around the apertures 211, 212, 216, and 217 slants the liquid crystal molecules 110. The adjacent apertures 211 and 216 of the upper and the lower substrates 10 and 20 induces the skewed field which slants the liquid crystal molecules 110 between the apertures 211 and 216 toward one direction. This slanted direction is from the aperture 216 of the lower substrate 20 to the aperture 211 of the upper substrate 10. As a result, the apertures 211 and 216 bound domains that respectively have different alignment directions.

Since the adjacent apertures defining the minute domains are perpendicular to each other, the long axis directions of the liquid crystals vary according to these liquid crystals' actual positions. However, the average long axis direction of the liquid crystals faces from the point where the lower substrate 20 apertures 216 and 217 cross to a point where the directions of the upper substrate 10 apertures 211 and 212 intersect, as illustrated by the arrows in FIG. 5. The average long axis direction, in other words, is directed from the center to the apex of the large square formed by the first and second apertures 211 and 212.

By the above described arrangement of the apertures 211, 212, 216, and 217, sixteen square shaped minute domains are formed in a pixel. In each minute domain, the average long axis direction of the liquid crystals is one of four directions. When the LCD is viewed from above, the directions of the average long axis directions of liquid crystals in two adjacent minute domains form a 90° angle.

When two polarizing films are arranged so that the polarizing directions P1 and P2 of the two polarizing films are perpendicular to each other, the average long axis direction of the liquid crystals in each minute domain forms a 45° angle with the polarizing directions P1 and P2.

Figure 7:
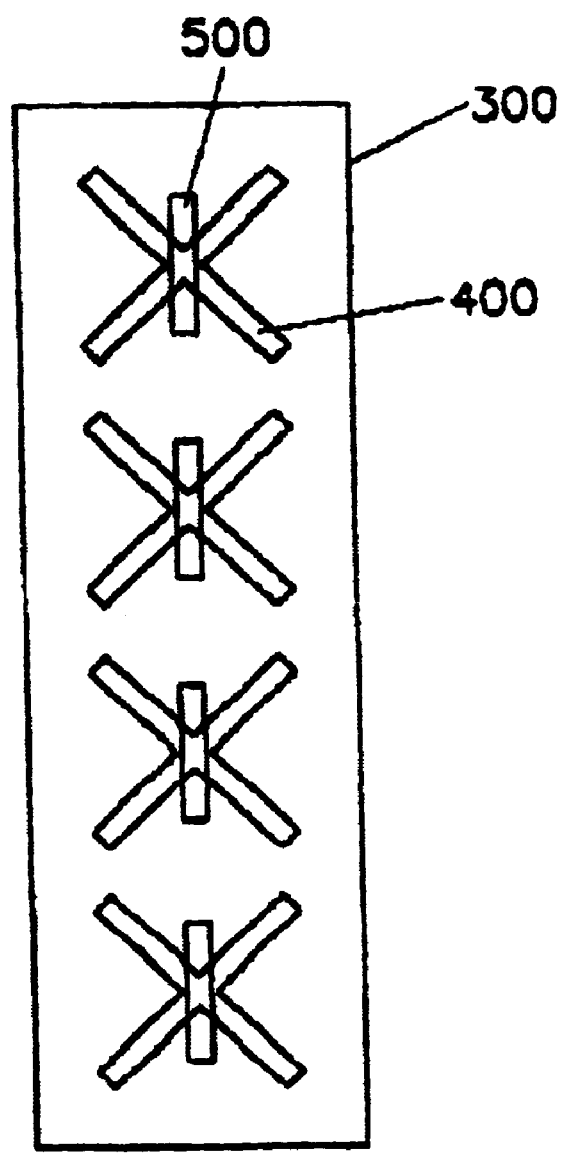
FIG. 7 is a partial plan view of an LCD according to a third embodiment of the present invention.

The apertures of the lower and upper substrates may have various shapes. FIG. 7 shows one of these shapes.

As shown in FIG. 7, X-shaped apertures 400 are formed in a pixel electrode of a lower substrate. Straight-line shaped apertures 500 vertically crossing the center of the X-shaped apertures 400 are formed in a color filter of an upper substrate.

An LCD structure wherein a black matrix overlaps a groove for forming multi-domains in order to reduce light leakage induced by the groove will now be described with reference to FIG. 8.

Figure 8:
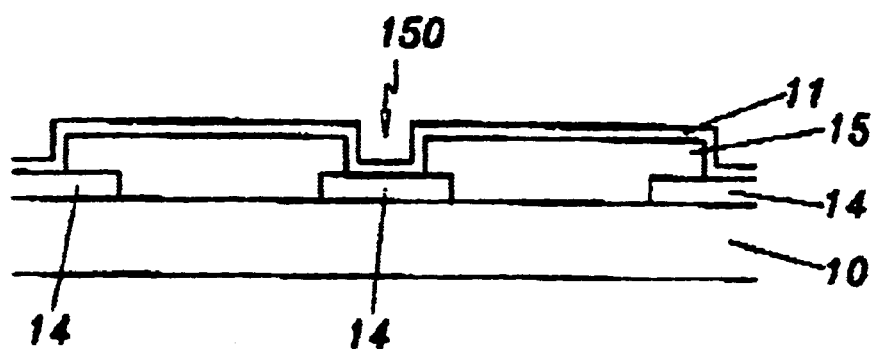
FIG. 8 is a cross-sectional view of a color filter array panel according to a fourth embodiment of the present invention.

As shown in FIG. 8, a black matrix 14 of materials such as a chromium (Cr) or black colored photoresist is formed on a transparent insulating substrate 10. The black matrix 14 is formed on a portion overlapping the groove 150 formed in the color filter 15 as well as on a boundary defining a pixel area. A color filter 15 having groove 150 is formed thereon. A common electrode 11 Is formed on the color filter 15.

A method of manufacturing a color filter array panel for an LCD according to an embodiment of the present invention will now be described.

First, a layer of a material such as chromium or black colored photoresist is formed on a substrate and patterned to form a black matrix.

Next, a photoresist layer colored either red, green, or blue (R, G, or B) is coated and patterned to form a color filter having a groove. These coating and patterning processes are repeated for the other two colors to complete the color filters.

Alternatively, after forming the all of the R. G, and B color filters, grooves may then be formed in the R, G and B color filters at a time.

Next, a layer of a transparent conducting material such as ITO is deposited to form a common electrode. To prevent the common electrode's disconnection around the groove, the common electrode is preferably formed of double thin transparent conducting layers.

As described above, multi-domains are made by forming grooves In color filters. Hence, the manufacturing method of a wide viewing angle LCD is simplified.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A panel for a liquid crystal display, comprising:
   a substrate;
   a plurality of pixel regions formed in the panel;
   color filters having grooves and formed on the substrate, each groove formed within a corresponding one of the plurality of pixel regions and dividing the corresponding pixel region into a plurality of domains; and
   a common electrode formed on the color filters.

2. The panel for a liquid crystal display as recited in claim 1, wherein the depth of the grooves is smaller than the thickness of the color filters.

3. The panel for a liquid crystal display as recited in claim 1, further comprising a black matrix formed on the substrate.

4. The panel for a liquid crystal display as recited in claim 3, wherein the black matrix defines the pixel area.

5. The panel for a liquid crystal display as recited in claim 1, further comprising a black matrix portion formed between the groove and the substrate.

6. A liquid crystal display, comprising:
   a first substrate including pixel electrodes having apertures;
   a second substrate facing said first substrate and including color filters having grooves and a common electrode formed on the color filters; and
   a plurality of pixel regions formed in said first substrate, wherein each groove is formed within a corresponding one of the plurality of pixel regions and divides the corresponding pixel region into a plurality of domains.

7. The liquid crystal display as recited in claim 6, wherein the grooves of the color filters overlap the pixel electrodes.

8. The liquid crystal display as recited in claim 6, wherein the depth of the grooves is smaller than the thickness of the color filters.

9. The liquid crystal display as recited in claim 6, further comprising a black matrix formed on the second substrate.

10. The liquid crystal display as recited in claim 6, further comprising a black matrix portion formed between the groove and the second substrate.

11. The liquid crystal display as recited in claim 6, wherein the grooves and the apertures form closed domains when they are viewed from above.

12. The liquid crystal display as recited in claim 6, wherein the grooves and the apertures are symmetrically arranged relative to each other.

13. The liquid crystal display as recited in claim 6, wherein the apertures have a first portion extending in a first direction and a second portion extending in a second direction that is different from the first direction.

14. The liquid crystal display as recited in claim 13, wherein the first direction and the second direction are perpendicular to each other.

15. The liquid crystal display as recited in claim 6, further comprising a liquid crystal layer interposed between the first substrate and the second substrate and having liquid crystal molecules of which long axes are vertically aligned relative to the first and the second substrates in the absence of an electric field.

16. The liquid crystal display as recited in claim 15, wherein the liquid crystal molecules have negative dielectric anisotropy.

17. The liquid crystal display as recited in claim 16, wherein the liquid crystal molecules have chirality.

18. The liquid crystal display as recited in claim 15, further comprising a first and a second polarizing films respectively attached on the outer surfaces of the first and the second substrates, wherein polarizing axes of the first and the second polarizing films are perpendicular to each other.

19. The liquid crystal display as recited in claim 15, wherein a plurality of minute domains are formed in a pixel area by the grooves and the apertures.

20. The liquid crystal display as recited in claim 19, wherein the minute domains' average direction of the long axes of liquid crystal molecules are directed toward two directions.

21. The liquid crystal display as recited in claim 19, wherein the minute domains' average direction of the long axes of liquid crystal molecules are directed toward four directions.

22. The liquid crystal display as recited in claim 20, wherein the average long axes make an angle of 40° to 50° with the polarizing directions of the first and the second polarizing films.

23. The liquid crystal display as recited in claim 21, wherein the average long axes make an angle of 40° to 50° to the polarizing directions of the first and the second polarizing films.

24. A liquid crystal display, comprising:
a first substrate;
a pixel electrode formed on the first substrate;
a plurality of pixel regions, each pixel region being defined as a region overlapping a corresponding one of the plurality of pixel electrodes;
a second substrate facing with the first substrate; and
a common electrode formed on the second substrate,
wherein the common electrode has a plurality of grooved portions, each grooved portion is formed within a corresponding one of the plurality of pixel regions and dividing the corresponding pixel region into a plurality of domains.

25. The liquid crystal display recited in claim 24, further comprising color filters having a plurality of grooves and formed on the second substrate,
wherein the plurality of grooved portions of the common electrode are formed due to the grooves of the color filters.

26. The liquid crystal display recited in claim 24, further comprising a black matrix portion formed between the groove and the second substrate.

27. A method of manufacturing a panel for a liquid crystal display, comprising the steps of:
forming a black matrix on a substrate;
forming color filters having grooves on the substrate, each groove is formed within a corresponding one of a plurality of pixel areas and divides the corresponding pixel area into a plurality of domains; and
forming a common electrode on the color filters.

28. The method of manufacturing a panel for a liquid crystal display recited in claim 27, wherein the common electrode is form by two depositions of ITO (indium thin oxide).

29. The method of manufacturing a panel for a liquid crystal display recited in claim 27, wherein the step of forming color filters having grooves comprises the substeps of:
coating and patterning a red colored photoresist to form red color filters having grooves located in a pixel area defined by the black matrix;
coating and patterning a green colored photoresist to form green color filters having grooves located in a pixel area; and
coating and patterning a blue colored photoresist to form blue color filters having grooves located in a pixel area.

30. The method of manufacturing a panel for a liquid crystal display recited in claim 27, wherein the step of forming the color filters comprises the substeps of:
sequentially forming red, green, and blue color filters by coating and patterning a red colored photoresist, a green colored photoresist, and a blue colored photoresist; and
patterning the red, green and blue color filters to form the grooves.

* * * * *

UNITED STATES PATENT AND TRADEMARK OFFICE
CERTIFICATE OF CORRECTION

| | |
|---|---|
| PATENT NO. | : 6,717,637 B1 |
| DATED | : April 6, 2004 |
| INVENTOR(S) | : Yea-Sun Yoon et al. |

It is certified that error appears in the above-identified patent and that said Letters Patent is hereby corrected as shown below:

Column 8,
Line 30, change "indium thin" to -- indium tin --.

Signed and Sealed this

Twenty-second Day of February, 2005

JON W. DUDAS
*Director of the United States Patent and Trademark Office*